(12) United States Patent  
Cho (10) Patent No.: US 8,745,294 B2  
(45) Date of Patent: Jun. 3, 2014

(54) DYNAMIC RANDOM ACCESS MEMORY FOR A SEMICONDUCTOR STORAGE DEVICE-BASED SYSTEM

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 490 days.

(21) Appl. No.: 13/078,048

(22) Filed: Apr. 1, 2011

(65) Prior Publication Data

US 2012/0254527 A1 Oct. 4, 2012

(51) Int. Cl.
 *G06F 13/14* (2006.01)
 *G06F 13/00* (2006.01)

(52) U.S. Cl.
 USPC ............. 710/71; 710/2; 710/5; 710/8; 710/15

(58) Field of Classification Search
 None
 See application file for complete search history.

(56) References Cited

U.S. PATENT DOCUMENTS

2007/0234182 A1* 10/2007 Wickeraad et al. ........... 714/763
2011/0211593 A1* 9/2011 Pepper et al. ................. 370/474

* cited by examiner

*Primary Examiner* — Scott Sun
(74) *Attorney, Agent, or Firm* — Saliwanchik, Lloyd & Eisenschenk, P.A.

(57) ABSTRACT

Embodiments of the present invention provide an approach for dynamic random access memory (DRAM)/SSD-based memory to improve memory usage. Specifically, embodiments of the present invention provide a field programmable gate array (FPGA) (SSD controller) that comprises a PCI-express interface for receiving and converting serial data to 64 bit data; a data/bit converter coupled to the interface for converting the 64 bit data to 128 bit data; and a memory controller coupled to the data converter for receiving and storing the 128 bit data in a set of DRAM units coupled to the memory controller. In general, the data converter comprises an input address buffer for receiving and buffering address information; an address matching component coupled to the input address buffer for analyzing the address information and determining a matching address based on the address information; an output address buffer coupled to the address matching component for buffering and outputting the matching address; an input data buffer for receiving and buffering 64 bit data; a data matching component coupled to the input data buffer for matching the 64 bit data with a corresponding address; and an output data buffer coupled to the data matching component for buffering and outputting the 128 bit data based on output of the data matching component.

20 Claims, 5 Drawing Sheets

DYNAMIC RANDOM ACCESS MEMORY FOR A SEMICONDUCTOR STORAGE DEVICE-BASED SYSTEM

CROSS-REFERENCE TO RELATED APPLICATION

This application is related in some aspects to commonly-owned, co-pending application Ser. No. 12/758,937, entitled "SEMICONDUCTOR STORAGE DEVICE", filed on Apr. 13, 2010, the entire contents of which are herein incorporated by reference. This application is also related in some aspects to commonly-owned, co-pending application Ser. No. 12/816,508 entitled SEMICONDUCTOR STORAGE DEVICE BASED CACHE MANAGER", filed on Jun. 16, 2010, the entire contents of which are herein incorporated by reference.

FIELD OF THE INVENTION

The present invention relates to a semiconductor storage device (SSD) of a PCI-Express (PCI-e) type. Specifically, the present invention relates to an SSD-based cache system.

BACKGROUND OF THE INVENTION

As the need for more computer storage grows, more efficient solutions are being sought. As is known, there are various hard disk solutions that store/read data in a mechanical manner as a data storage medium. Unfortunately, data processing speed associated with hard disks is often slow. Moreover, existing solutions still use interfaces that cannot catch up with the data processing speed of memory disks having high-speed data input/output performance as an interface between the data storage medium and the host. Therefore, there is a problem in the existing area in that the performance of the memory disk cannot be property utilized.

SUMMARY OF THE INVENTION

Embodiments of the present invention provide an approach for dynamic random access memory (DRAM)/SSD-based memory to improve memory usage. Specifically, embodiments of the present invention provide a field programmable gate array (FPGA) (SSD controller) that comprises a PCI-express interface for receiving and converting serial data to 64 bit data; a data/bit converter coupled to the interface for converting the 64 bit data to 128 bit data; and a memory controller coupled to the data converter for receiving and storing the 128 bit data in a set of DRAM units coupled to the memory controller. In general, the data converter comprises an input address buffer for receiving and buffering address information; an address matching component coupled to the input address buffer for analyzing the address information and determining a matching address based on the address information; an output address buffer coupled to the address matching component for buffering and outputting the matching address; an input data buffer for receiving and buffering 64 bit data; a data matching component coupled to the input data buffer for matching the 64 bit data with a corresponding address; and an output data buffer coupled to the data matching component for buffering and outputting the 128 bit data based on output of the data matching component.

A first aspect of the present invention provides a controller for a dynamic random access memory (DRAM)-based semiconductor storage device (SSD) system, comprising: an interface for receiving and converting serial data to 64 bit data; a data converter coupled to the interface for converting the 64 bit data to 128 bit data; and a memory controller coupled to the data converter for receiving and storing the 128 bit data in a set of DRAM units coupled to the memory controller.

A second aspect of the present invention provides a data converter for a semiconductor storage device (SSD) controller, comprising: an input address buffer for receiving and buffering address information; an address matching component coupled to the input address buffer for analyzing the address information and determining a matching address based on the address information; an output address buffer coupled to the address matching component for buffering and outputting the matching address; an input data buffer for receiving and buffering 64 bit data; a data matching component coupled to the input data buffer for matching the 64 bit data with a corresponding address; and an output data buffer coupled to the data matching component for buffering and outputting the 128 bit data based on output of the data matching component.

A third aspect of the present invention provides a method for storing data in a dynamic random access memory (DRAM)-based semiconductor storage device (SSD) system, comprising: receiving serial data via an interface; converting the serial data to 64 bit data via the interface; sending the 64 bit data to a data converter that is coupled to the interface; converting the 64 bit data to 128 bit data using the data converter; sending the 128 bit data to a memory controller that is coupled to the data converter; and storing the 128 bit data in a set of DRAM units using the memory controller.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments will now be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limited to this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a storage device of a PCI-Express (PCI-e) type according to an embodiment of the present invention will be described in detail with reference to the accompanying drawings.

As indicated above, embodiments of the present invention provide an approach for dynamic random access memory (DRAM)/SSD-based memory to improve memory usage. Specifically, embodiments of the present invention provide a field programmable gate array (FPGA) (SSD controller) that comprises a PCI-express interface for receiving and converting serial data to 64 bit data; a data/bit converter coupled to the interface for converting the 64 bit data to 128 bit data; and a memory controller coupled to the data converter for receiving and storing the 128 bit data in a set of DRAM units coupled to the memory controller. In general, the data converter comprises an input address buffer for receiving and buffering address information; an address matching component coupled to the input address buffer for analyzing the address information and determining a matching address based on the address information; an output address buffer coupled to the address matching component for buffering and outputting the matching address; an input data buffer for receiving and buffering 64 bit data; a data matching component coupled to the input data buffer for matching the 64 bit data with a corresponding address; and an output data buffer coupled to the data matching component for buffering and outputting the 128 bit data based on output of the data matching component.

Figure 1:
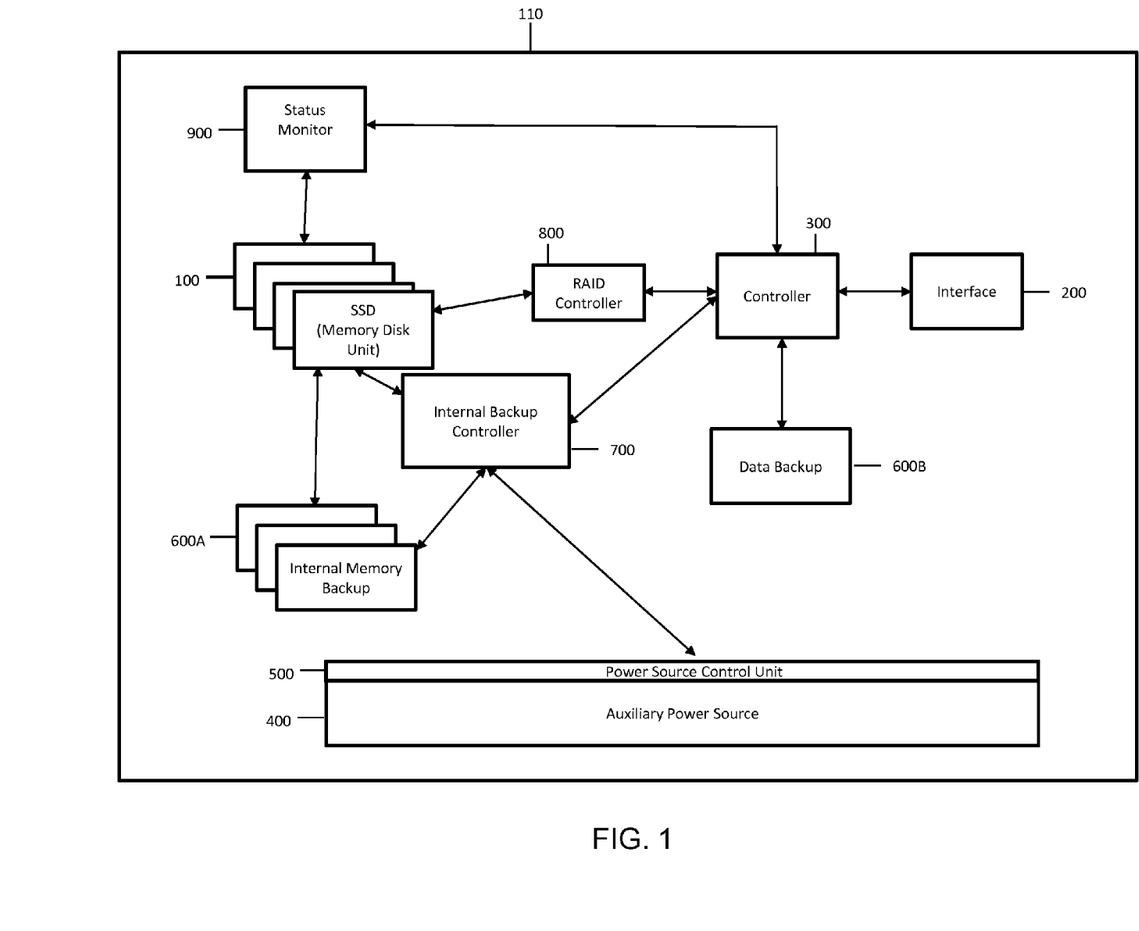
FIG. 1 is a diagram illustrating a configuration of a storage device of a PCI-Express (PCI-e) type according to an embodiment of the present invention.

The storage device of a PCI-Express (PCI-e) type supports a low-speed data processing speed for a host by adjusting synchronization of a data signal transmitted/received between the host and a memory disk during data communications between the host and the memory disk through a periphery interface such as a PCI-Express interface, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize Serial Attached Small Computer System Interface (SAS)/Serial Advanced Technology Advancement (SATA) technology in which a SAS/SATA type storage device is provided that utilizes a SAS/SATA interface Referring now to FIG. 1, a diagram schematically illustrating a configuration of a PCI-Express type, RAID controlled semiconductor storage device (e.g., for providing storage for a serially attached computer device) according to an embodiment of the invention is shown. As depicted, FIG. 1 shows a RAID controlled PCI-Express type storage device 110 according to an embodiment of the invention which includes a SSD memory disk unit 100 (referred to herein as SSD memory disk unit, SSD, and/or SSD memory disk unit) comprising: a plurality of memory disks having a plurality of volatile semiconductor memories/memory units (also referred to herein as high-speed SSD memory disk units 100); a RAID controller 800 coupled to SSD memory disk units 100; an interface unit 200 (e.g., PCI-Express host) which interfaces between the SSD memory disk unit and a host; a controller unit 300; an auxiliary power source unit 400 that is charged to maintain a predetermined power using the power transferred from the host through the PCI-Express host interface unit; a power source control unit 500 that supplies the power transferred from the host through the PCI-Express host interface unit to the controller unit 300, the SSD memory disk units 100, the backup storage unit, and the backup control unit which, when the power transferred from the host through the PCI-Express host interface unit is blocked or an error occurs in the power transferred from the host, receives power from the auxiliary power source unit and supplies the power to the SSD memory disk unit through the controller unit; a backup storage unit 600A-B that stores data of the SSD memory disk unit; and a backup control unit 700 that backs up data stored in the SSD memory disk unit in the backup storage unit, according to an instruction from the host or when an error occurs in the power transmitted from the host; and a redundant array of independent disks (RAID) controller 800 coupled to SSD memory disk unit 100, controller 300, and internal backup controller 700.

The SSD memory disk unit 100 includes a plurality of memory disks provided with a plurality of volatile semiconductor memories for high-speed data input/output (for example, DDR, DDR2, DDR3, SDRAM, and the like), and inputs and outputs data according to the control of the controller 300. The SSD memory disk unit 100 may have a configuration in which the memory disks are arrayed in parallel.

The PCI-Express host interface unit 200 interfaces between a host and the SSD memory disk unit 100. The host may be a computer system or the like, which is provided with a PCI-Express interface and a power source supply device.

The controller unit 300 adjusts synchronization of data signals transmitted/received between the PCI-Express host interface unit 200 and the SSD memory disk unit 100 to control a data transmission/reception speed between the PCI-Express host interface unit 200 and the SSD memory disk unit 100.

As depicted, a PCI-e type RAID controller 800 can be directly coupled to any quantity of SSD memory disk units 100. Among other things, this allows for optimum control of SSD memory disk units 100. Among other things, the use of a RAID controller 800:
1. Supports the current backup/restore operations.
2. Provides additional and improved backup function by performing the following:
   a) the internal backup controller 700 determines the backup (user's request order or the status monitor detects power supply problems);
   b) the internal backup controller 700 requests a data backup to SSD memory disk units;
   c) the internal backup controller 700 requests an internal backup device to backup data immediately;
   d) the internal backup controller 700 monitors the status of the backup for the SSD memory disk units and internal backup controller; and
   e) the internal backup controller 700 reports the internal backup controller's status and end-op.
3. Provides additional and improved restore function by performing the following:
   a) the internal backup controller 700 determines the restore (user's request order or the status monitor detects power supply problems);
   b) the internal backup controller 700 requests a data restore to the SSD memory disk units;
   c) the internal backup controller 700 requests an internal backup device to restore data immediately;
   d) the internal backup controller 700 monitors the status of the restore for the SSD memory disk units and internal backup controller; and
   e) the internal backup controller 700 reports the internal backup controller status and end-op.

Figure 2:
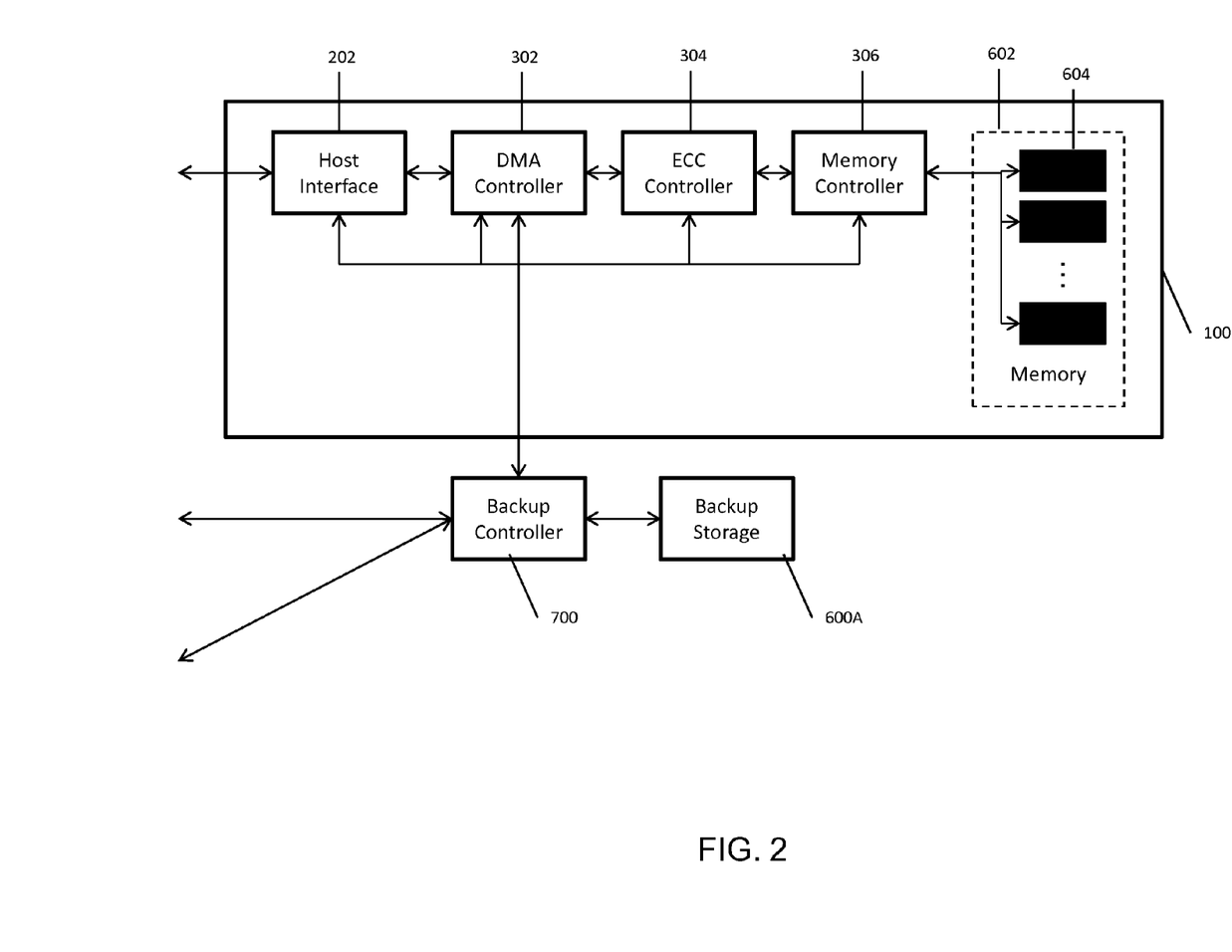
FIG. 2 is a diagram of the high-speed SSD of FIG. 1 according to an embodiment of the present invention.

Referring now to FIG. 2, a diagram schematically illustrating a configuration of the high-speed SSD 100 is shown. As depicted, SSD memory disk unit 100 comprises: a host interface 202 (e.g., PCI-Express host) (which can be interface 200 of FIG. 1, or a separate interface as shown); a Direct Memory Access (DMA) controller 302 interfacing with a backup control module 700; an ECC controller 304; and a memory controller 306 for controlling one or more blocks 604 of memory 602 that are used as high-speed storage. Also shown are backup controller 700 coupled to DMA controller and backup storage unit 600A coupled to backup controller 700.

In general, DMA is a feature of modern computers and microprocessors that allows certain hardware subsystems within the computer to access system memory for reading and/or writing independently of the central processing unit. Many hardware systems use DMA including disk drive controllers, graphics cards, network cards, and sound cards. DMA is also used for intra-chip data transfer in multi-core processors, especially in multiprocessor system-on-chips, where its processing element is equipped with a local memory (often called scratchpad memory) and DMA is used for transferring data between the local memory and the main memory. Computers that have DMA channels can transfer data to and from devices with much less CPU overhead than computers without a DMA channel. Similarly, a processing element inside a multi-core processor can transfer data to and from its local memory without occupying its processor time and allowing computation and data transfer concurrency.

Without DMA, using programmed input/output (PIO) mode for communication with peripheral devices, or load/store instructions in the case of multi-core chips, the CPU is typically fully occupied for the entire duration of the read or write operation, and is thus unavailable to perform other work. With DMA, the CPU would initiate the transfer, do other operations while the transfer is in progress, and receive an interrupt from the DMA controller once the operation has been done. This is especially useful in real-time computing applications where not stalling behind concurrent operations is critical.

Figure 3:
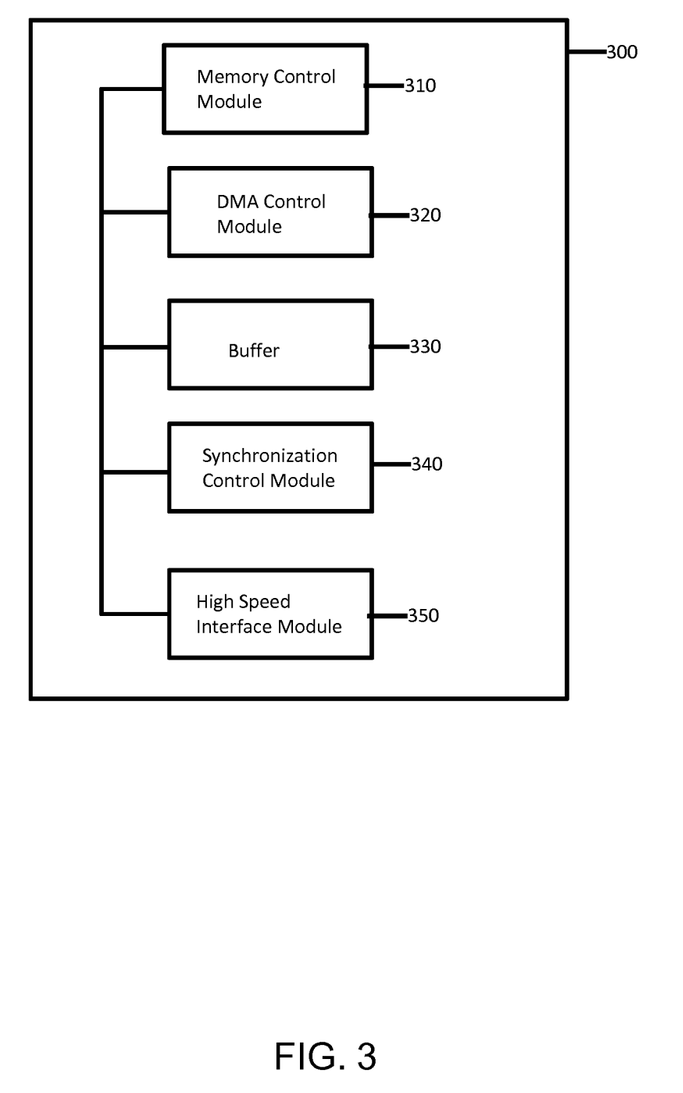
FIG. 3 is a diagram illustrating a configuration of a controller unit in FIG. 1 according to an embodiment of the present invention.

Referring now to FIG. 3, the controller unit 300 of FIG. 1 is shown as comprising: a memory control module 310 which controls data input/output of the SSD memory disk unit 100; a DMA control module 320 which controls the memory control module 310 to store the data in the SSD memory disk unit 100, or reads data from the SSD memory disk unit 100 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the SSD memory disk unit 100 by the control of the DMA control module 320 through the DMA control module 320 and the memory control module 310, adjusts synchronization of a data signal so as to have a communication speed corresponding to a PCI-Express communications protocol to transmit the synchronized data signal to the PCI-Express host interface unit 200, and when receiving a data signal from the host through the PCI-Express host interface unit 200, adjusts synchronization of the data signal so as to have a transmission speed corresponding to a communications protocol (for example, PCI, PCI-x, or PCI-e, and the like) used by the SSD memory disk unit 100 to transmit the synchronized data signal to the SSD memory disk unit 100 through the DMA control module 320 and the memory control module 310; and a high-speed interface module 350 which processes the data transmitted/received between the synchronization control module 340 and the DMA control module 320 at high speed. Here, the high-speed interface module 350 includes a buffer having a double buffer structure and a buffer having a circular queue structure, and processes the data transmitted/received between the synchronization control module 340 and the DMA control module 320 without loss at high speed by buffering the data and adjusting data clocks.

Figure 4:
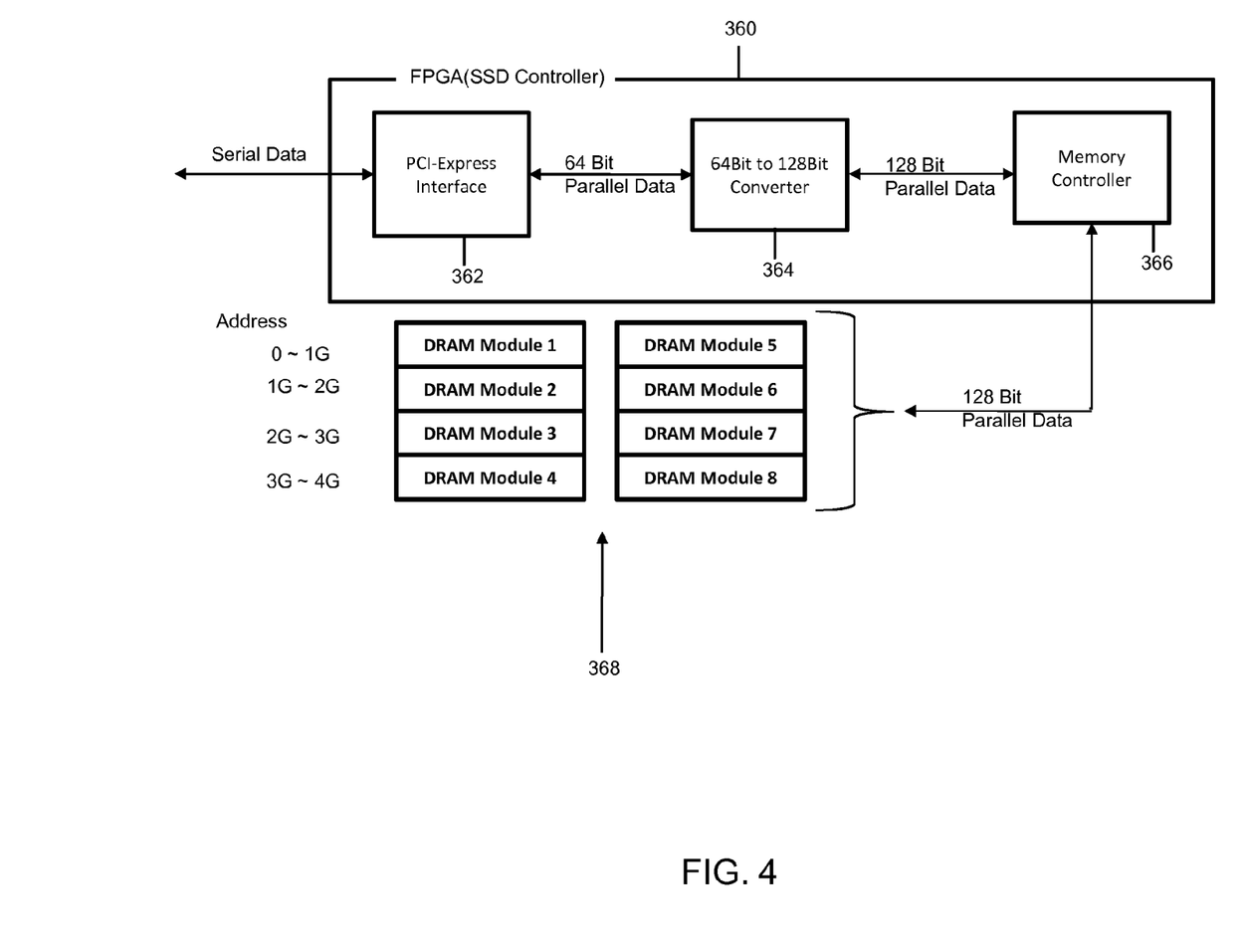
FIG. 4 is a diagram field programmable gate array (FPGA)-based controller embodiment of the present invention.

Referring now to FIG. 4, a field programmable gate array/SSD controller (controller 360) according to an embodiment of the present invention is shown. A field-programmable gate array (FPGA) is an integrated circuit (IC) that can be programmed in the field after manufacture. FPGAs are similar in principle to, but have vastly wider potential application than, programmable read-only memory (PROM) chips. FPGAs are used by engineers in the design of specialized ICs that can later be produced hard-wired in large quantities for distribution to computer manufacturers and end users. Ultimately, FPGAs might allow computer users to tailor microprocessors to meet their own individual needs. In one embodiment, controller 360 can be used in conjunction with, or as an alternative to, controller 300 of FIG. 1. Regardless, among other things, controller 360 converts 64 bit data to 128 bit data for storage in a set of dynamic random access memory (DRAM) units 368. Specifically, as shown, controller 360 comprises a PCI-express interface (interface 362) for receiving serial data and converting the same to 64 bit data. Coupled to interface 362 is data converter 364 for performing a further bit conversion of the 64 bit data (e.g., converting the 64 bit data to 128 bit data). A memory controller 366 is coupled to data converter 364 for receiving the converted data from data converter 364, and for storing the same in DRAM units 368. The process can be followed in reverse when data retrieval is needed. As further shown, DRAM units 368 have an addressing convention. This can be used to store particular pieces of data in particular locations for more organized and efficient storage/retrieval operations.

Figure 5:
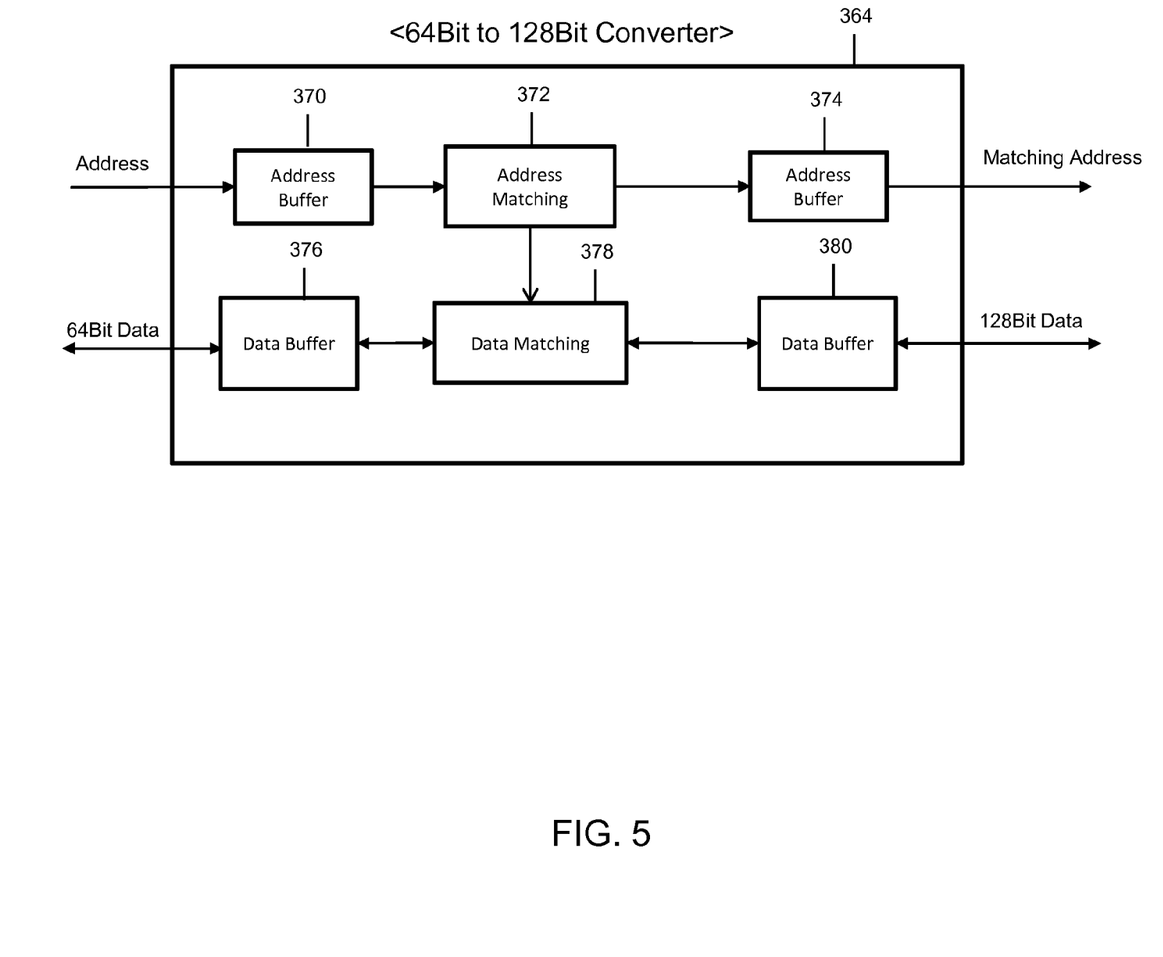
FIG. 5 is a data converter according to an embodiment of the present invention.

Referring to FIG. 5, a more detailed diagram of data converter 364 is shown. As depicted, data converter 364 includes both data and addressing functions. Specifically, an input address buffer 370 receives and buffers address information that corresponds to 64 bit data that is received and buffered by an input data buffer 376. An address matching component 372 is coupled to address buffer 370, while a data matching component 378 is coupled to data buffer 376. Address matching component 372 analyzes the address information and determines a matching address based thereon. a Data matching component 378 matches the 64 bit data with a corresponding address. To this extent, address matching component 372 communicates with (e.g., exchange address and or data information with) data matching component 378. In any event, coupled to address matching component 372 and data matching component 378 are an output address buffer 374 and an output data buffer 380, respectively. In general, output address buffer 374 buffers and output matching addresses, while output data buffer 380 buffers and receives data and outputs bit-converted data based on output of the data matching component. Along these lines, address information is received by, and a matching address is outputted, from data converter 364. Moreover, data converter 364 will receive 64 bit data and output 128 bit data. As indicated above, this data can then be stored (and later retrieved) in DRAM units 364 according to the address information in one or more operations performed and/or controlled by memory controller 366 (FIG. 4).

Referring back to FIG. 1, auxiliary power source unit 400 may be configured as a rechargeable battery or the like, so that it is normally charged to maintain a predetermined power using power transferred from the host through the PCI-Express host interface unit 200 and supplies the charged power to the power source control unit 500 according to the control of the power source control unit 500.

The power source control unit 500 supplies the power transferred from the host through the PCI-Express host interface unit 200 to the controller unit 300, the SSD memory disk unit 100, the backup storage unit 600A-B, and the backup control unit 700.

In addition, when an error occurs in a power source of the host because the power transmitted from the host through the PCI-Express host interface unit 200 is blocked, or the power transmitted from the host deviates from a threshold value, the power source control unit 500 receives power from the auxiliary power source unit 400 and supplies the power to the SSD memory disk unit 100 through the controller unit 300.

The backup storage unit 600A-B is configured as a low-speed non-volatile storage device such as a hard disk and stores data of the SSD memory disk unit 100.

The backup control unit 700 backs up data stored in the SSD memory disk unit 100 in the backup storage unit 600A-B by controlling the data input/output of the backup storage unit 600A-B and backs up the data stored in the SSD memory disk unit 100 in the backup storage unit 600A-B according to an instruction from the host, or when an error occurs in the power source of the host due to a deviation of the power transmitted from the host deviates from the threshold value.

The storage device of a serial-attached small computer system interface/serial advanced technology attachment (PCI-Express) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A controller for a dynamic random access memory (DRAM)-based semiconductor storage device (SSD) system, comprising:
   an interface for receiving and converting serial data to 64 bit data;
   a data converter coupled to the interface for converting the 64 bit data to 128 bit data, wherein memory addresses for storage of the 64 bit data in a set of DRAM units are analyzed to determine a matching address; and
   a memory controller coupled to the data converter for receiving and storing the 128 bit data in the set of DRAM units coupled to the memory controller.

2. The controller of claim 1, the interface comprising a PCI-express interface.

3. The controller of claim 1, the controller comprising a field programmable gate array (FPGA) controller.

4. The controller of claim 1, the set of DRAM units being addressable, and the 128 bit data being stored in the set of DRAM units based upon a corresponding address.

5. The controller of claim 1, the data converter comprising:
   an input address buffer for receiving and buffering address information;
   an address matching component coupled to the input address buffer for analyzing the address information and determining the matching address based on the address information; and
   an output address buffer coupled to the address matching component for buffering and outputting the matching address.

6. The controller of claim 5, the data converter further comprising:
   an input data buffer for receiving and buffering 64 bit data;
   a data matching component coupled to the input data buffer for matching the 64 bit data with a corresponding address; and
   an output data buffer coupled to the data matching component for buffering and outputting the 128 bit data based on output of the data matching component.

7. The controller of claim 1, the 128 bit data comprising parallel data.

8. A data converter for a semiconductor storage device (SSD) controller, comprising:
- an input address buffer for receiving and buffering address information;
- an address matching component coupled to the input address buffer for analyzing the address information and determining a matching address based on the address information, wherein memory addresses for storage of 64 bit data in a set of DRAM units are analyzed to determine the matching address;
- an output address buffer coupled to the address matching component for buffering and outputting the matching address;
- an input data buffer for receiving and buffering the 64 bit data;
- a data matching component coupled to the input data buffer for matching the 64 bit data with a corresponding address; and
- an output data buffer coupled to the data matching component for buffering and outputting the 128 bit data based on output of the data matching component.

9. The data converter of claim 8, the SSD controller further comprising:
- an interface for receiving and converting serial data into the 64 bit data; and
- a memory controller coupled to the data converter for receiving and storing the 128 bit data in the set of DRAM units.

10. The data converter of claim 9, the interface comprising a PCI-express interface.

11. The data converter of claim 9, the SSD controller being a field programmable gate array (FPGA) controller.

12. The data converter of claim 9, the set of DRAM units being addressable, and the 128 bit data being stored in the set of DRAM units based upon a corresponding address.

13. The data converter of claim 8, the 128 bit data comprising parallel data.

14. A method for storing data in a dynamic random access memory (DRAM)-based semiconductor storage device (SSD) system, comprising:
- receiving serial data via an interface;
- converting the serial data to 64 bit data via the interface;
- sending the 64 bit data to a data converter that is coupled to the interface;
- converting the 64 bit data to 128 bit data using the data converter, wherein memory addresses for storage of the 64 bit data in a set of DRAM units are analyzed to determine a matching address;
- sending the 128 bit data to a memory controller that is coupled to the data converter; and
- storing the 128 bit data in the set of DRAM units using the memory controller.

15. The method of claim 14, the interface comprising a PCI-express interface.

16. The method of claim 14, the set of DRAM units being addressable, and the 128 bit data being stored in the set of DRAM units based upon a corresponding address.

17. The method of claim 14, the converting the 64 bit data to the 128 bit data comprising:
- receiving and buffering address information via an input address buffer;
- analyzing the address information and determining the matching address based on the address information via sending an address matching component coupled to the input address buffer; and
- buffering and outputting the matching address via an output address buffer coupled to the address matching component.

18. The method of claim 17, the data converter further comprising:
- receiving and buffering the 64 bit data via an input data buffer;
- matching the 64 bit data with a corresponding address via a data matching component coupled to the input data buffer; and
- buffering and outputting the 128 bit data based on output of the data matching component via an output data buffer coupled to the data matching component.

19. The method of claim 14, the 128 bit data comprising parallel data.

20. The method of claim 14, the method being performed via a field programmable gate array (FPGA)-based controller.

* * * * *